Dec. 3, 1968   E. A. THOMPSON   3,413,807
MACHINE TOOL

Original Filed Dec. 30, 1963   11 Sheets-Sheet 1

FIG. I

INVENTOR.
EARL A. THOMPSON
BY *J. L. Chisholm*
ATTORNEY

INVENTOR.
EARL A. THOMPSON

INVENTOR.
EARL A. THOMPSON
BY J. L. Chisholm
ATTORNEY

Dec. 3, 1968  E. A. THOMPSON  3,413,807
MACHINE TOOL
Original Filed Dec. 30, 1963  11 Sheets-Sheet 11

INVENTOR.
EARL A. THOMPSON
BY J. L. Chisholm
ATTORNEY

United States Patent Office 3,413,807
Patented Dec. 3, 1968

3,413,807
MACHINE TOOL
Earl A. Thompson, Bloomfield Hills, Mich., assignor to Earl A. Thompson Manufacturing Co., a corporation of Michigan
Continuation of application Ser. No. 334,503, Dec. 30, 1963. This application Jan. 30, 1967, Ser. No. 621,092
17 Claims. (Cl. 60—54.5)

ABSTRACT OF THE DISCLOSURE

A tool, e.g. a grinding wheel, is reciprocated by either of two hydraulic link actuators, the pulsators of which may be constantly operated by cams against a return pressure. One actuator may provide a long stroke, e.g. to remove the grinding wheel from the work and insert it in a new work piece. The other actuator may oscillate the wheel rapidly on a short stroke in the work piece while it is grinding. The actuators are selectively made operative or inoperative (while their pulsators are continuously cycled) by confining liquid to the appropriate hydraulic circuit or permitting the liquid to surge into and out of the circuit. This latter is accomplished by a single ball valve moved to one of two positions by a third hydraulic actuator against a return spring.

This application is a continuation of my application Ser. No. 334,503 filed Dec. 30, 1963 which is abandoned.

This invention relates to machine tools and particularly to an oscillator for moving a part, such as a tool carriage back and forth. It is particularly, but not exclusively, suitable for oscillating the grinding wheel of an internal grinder, for example as disclosed in my U.S. Patent 3,218,760 issued Nov. 23, 1965. The invention includes improvements on the devices disclosed in this and in my U.S. Patents 3,003,292 and 3,071,929, the disclosures of all of which are incorporated herein by reference.

In such grinders a rotating grinding wheel is mounted on a head or slide which moves the wheel into and out of longitudinal grinding position within the rotating work piece, oscillates the wheel longitudinally over the work on a short stroke while rough grinding, withdraws the wheel for dressing, reinserts it for finish grinding, and (after grinding a number of work pieces) withdraws the worn wheel from the work for replacement. The slide is then oscillated through a long stroke over a diamond to dress the new wheel to proper size, roundness and alignment before the slide finally inserts the wheel again into the work.

In my Patent 3,218,760, and in Patent 3,003,292, I have disclosed oscillators for the grinding wheel including various forms of constant volume, liquid column motion transmitters which have an actuator or pump piston moved by a cam and a follower piston moved by the liquid which is moved by the actuator piston. While these oscillators operate satisfactorily within their inherent limitations, I have discovered that various improvements can be made and I have invented new forms of actuating and control mechanisms which reduce or eliminate various disadvantages of prior known devices.

For example in 3,003,292 there is a single actuator piston driven by a push-pull rod which is mechanically brought into operative relationship with either of a pair of constantly rotating cams by moving either cam into or out of contact with a cam follower which drives the push-pull rod. Each cam performs one of the two required oscillation cycles. In the light of subsequent developments this is a relatively awkward and expensive device and subject to various undesirable errors.

Both of the known oscillators referred to are inconveniently incorporated in the grinder, and are not as adapted as is desirable to be used.

In U.S. Patent 3,218,760 valves have been substituted for the mechanical shifting arrangement of 3,003,292, but this is complicated and expensive and has other disadvantages.

One of the objects of the invention is to provide an improved oscillator which is simple, reliable, precise and compact and can be readily adapted to various designs of grinder, and especially to provide a unitary package of oscillator, drive motor and controls.

Another object is to provide an improved compact and efficient arrangement of cams, cam followers and actuating devices driven thereby for operating actuators, especially, but not necessarily, pulsators of the confined liquid column type.

Another object is to provide an improved single acting pulsator constantly connected to a carriage motor and constantly driven while being rendered operative or inoperative selectively by confining its liquid to constant volume or permitting its liquid to change volume, and especially to provide an improved valve and improved controls therefor for confining the liquid in the oscillator circuit or permitting the liquid to change volume while the actuator of the oscillator is operating.

Another object is to provide an improved control valve for rendering a running oscillator operative or not which valve is not subject to leakage outside the system, particularly such a valve in a system using a control pressure and oscillating pressure, both superior to an opposing return pressure, arranged to direct any leakage into the return portion of the system Another object is to provide an improved oscillator for dressing a grinding wheel combined with a simple positive and reliable control for rendering the oscillator operative or not while the oscillator is constantly being driven from a power source.

Another object is to provide an improved oscillator for dressing a grinding wheel combined with a simple, effective and precise control of the position of the dressing tool, coordinated with the dressing oscillator.

Another object is to provide an improved dressing tool feed actuator moved either in response to oscillation of a grinding wheel at one general location or in response to non-oscillating rectilinear movement of the wheel into or out of grinding position in a work piece.

Another object is to provide a double-acting hydraulic motor for placing a tool carriage and a control for selectively directing biasing pressure to either end of the motor while directing positioning pressure or oscillating pressure to the other end.

Another object is to provide an improved single acting pulsator or actuator for advancing or retracting a tool carriage against a biasing or return force and to provide separate single acting pulsators for oscillating the carriage at different times in its cycle and by different modes of oscillation, against a constant biasing or return pressure.

Another object is to provide a pair of single acting pulsators for oscillating the tool carriage at different times and by different modes of oscillation, which pulsators are constantly connected hydraulically to a carriage motor but are rendered operative selectively by improved hydraulic apparatus.

Other objects and advantages of the invention will be apparent from the following description and from the accompanying drawings, in which each reference character always designates the same part whenever it occurs.

In the drawings:

FIG. 4 represents the oscillator with the grinding wheel in grinding position and being oscillated through a short grinding stroke by one of two pulsators.

FIG. 5 represents the grinding wheel retracted from the grinding position to be dressed for final finish grinding.

FIG. 6 shows the apparatus when dressing a new wheel, the wheel being retracted from grinding position and being oscillated through a long dressing stroke by the other pulsator.

Figure 1:
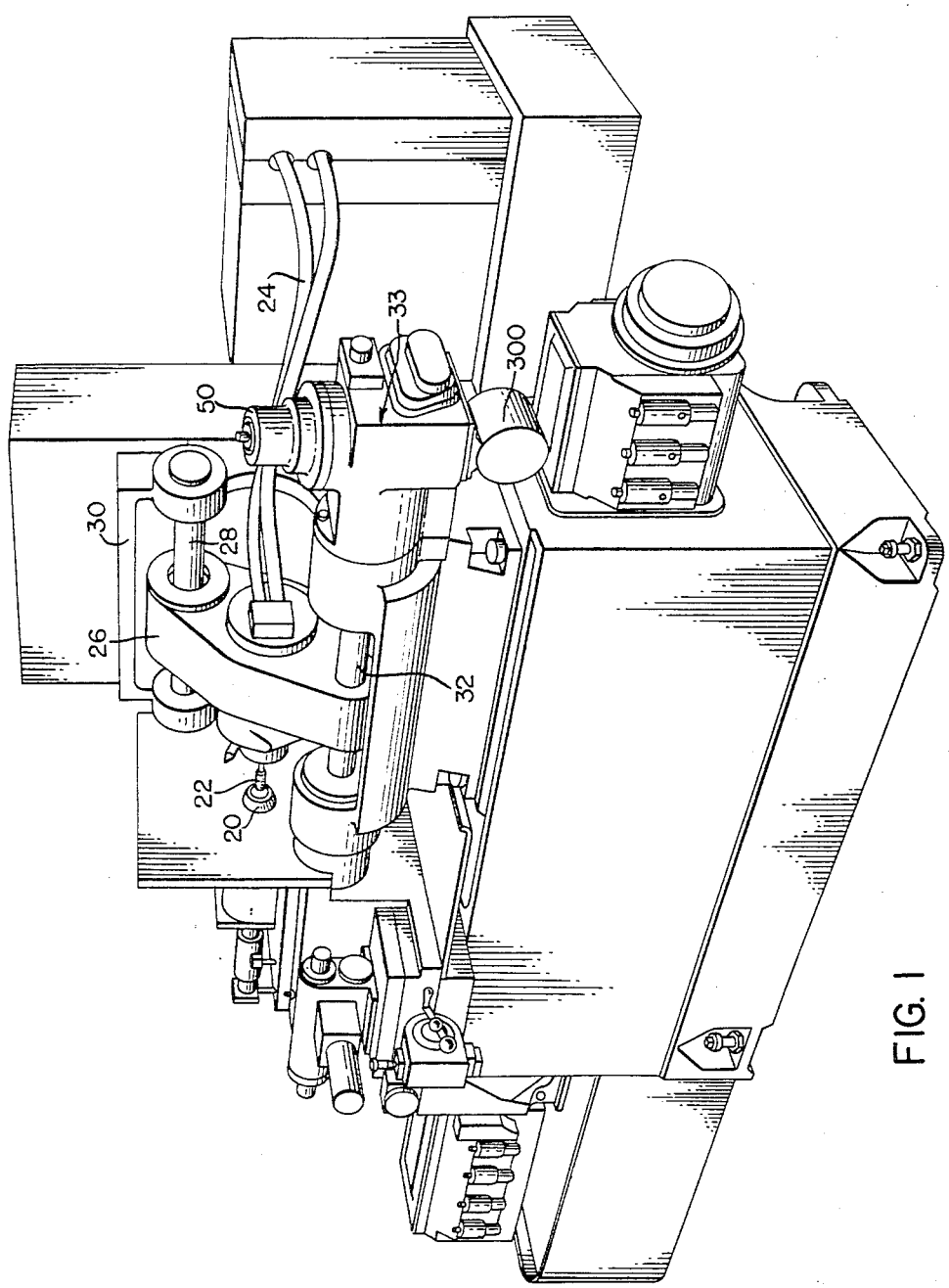
FIG. 1 is a perspective of one form of internal grinder having an oscillator embodying one form of the invention.
Figure 2:
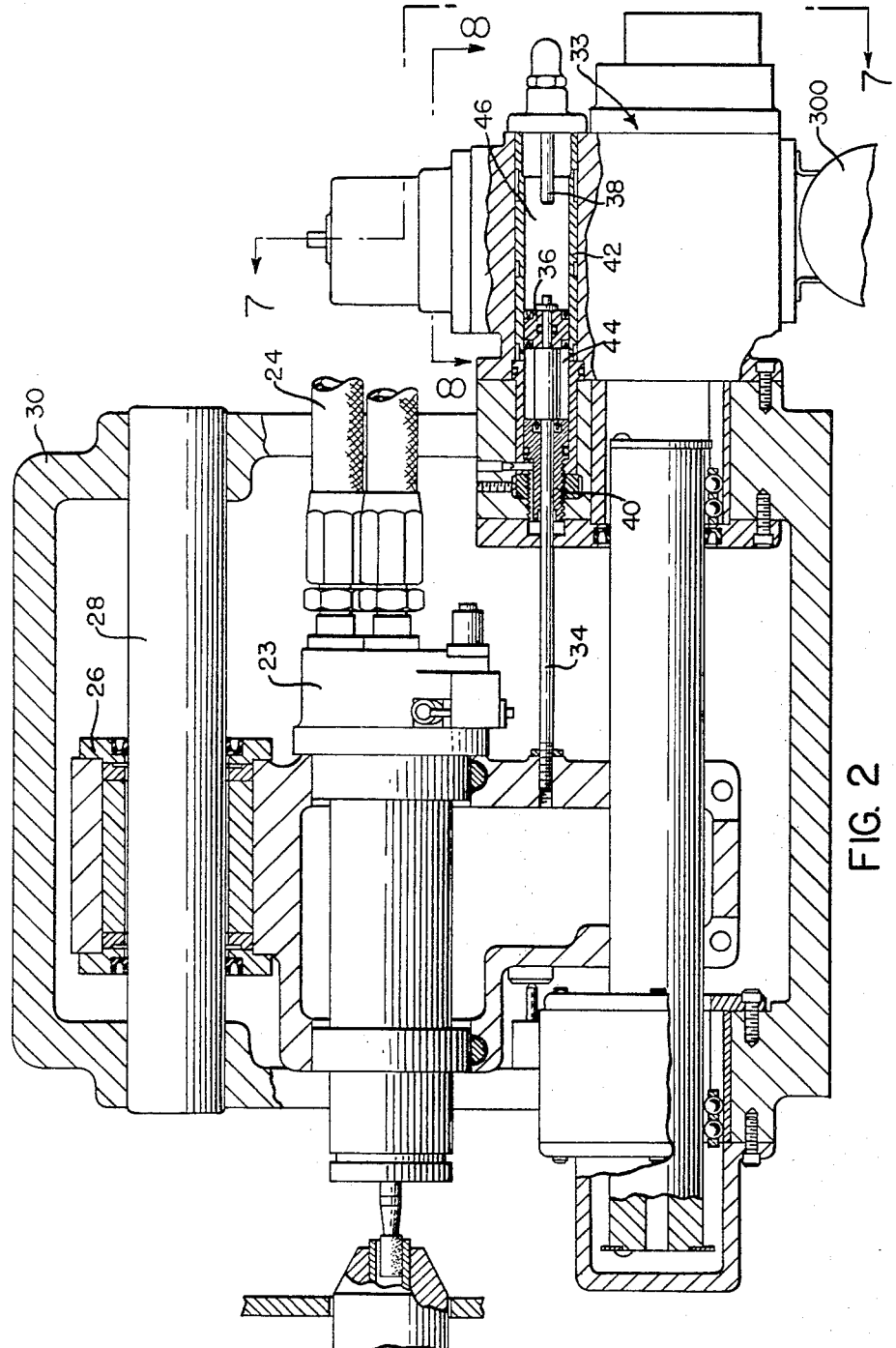
FIG. 2 is a structural section, arranged schematically, of the grinding wheel carriage as seen from the front of the grinder of FIG. 1.

Referring to FIGS. 1 and 2, the grinder may be constructed in general as shown in my Patent 3,218,760. It includes a rotatable work holder 20 driven by a motor. The grinding wheel 22 is mounted on a spindle driven by a hydraulic turbine 23 supplied by fluid pressure hoses 24. The turbine and grinding wheel are mounted on a sliding carriage 26 shown in greater detail in FIG. 2. The carriage slides on an upper guide rod 28 fixed in the frame 30 of the grinder and is clamped to a lower guide rod 32 which slides in bearings in the frame.

The carriage and lower rod 32 are moved toward and away from the work by an oscillator designated as a whole by 33, which is the subject of this invention.

The oscillator includes an oscillator rod 34 fastened to the carriage and connected to a piston 36 slidable between adjustable stops 38 and 40 in a cylinder 42 which the piston divides into a rod end retracting chamber 44 and a head end of advancing cylinder 46.

In each of FIGS. 3 to 6 broken lines indicate parts of the apparatus that are inactive during the particular conditions depicted by the particular figure. An arrow, whether solid or broken, indicates that the cam to which it is applied is rotating. In each of these four figures the pipes and chambers are coded to indicate the condition and pressure therein. In this code O indicates pulsating oil producing oscillation of the piston 36. H indicates oil which is functioning in an actuator or pulsator, for example to hold a part in a fixed position to serve as reaction, or to move oil to exert a constant or varying pressure to move a part. RO indicates oil at accumulator pressure, called return oil and designated RO in this description. V indicates that the line or chamber is vented to the atmosphere. S indicates oil under pressure from any suitable supply for operating a clutch shifting mechanism. This may be either RO or oil from any suitable source of appropriate pressure.

Referring to FIGS. 3 to 6, the piston 36 is advanced toward the work by superior pressure of oil in the head end 46 and is retracted by superior pressure in the rod end 44. It is oscillated by maintaining a constant return pressure in the head end while cyclically varying the pressure in the rod end above and below the return pressure. Return pressure is supplied from a pressure reservoir or expansible accumulator 50 containing a body 52 of oil held under substantially constant pressure by air in a chamber 54 supplied by a pump 56 and separated from the oil by a piston 58.

Figure 3:
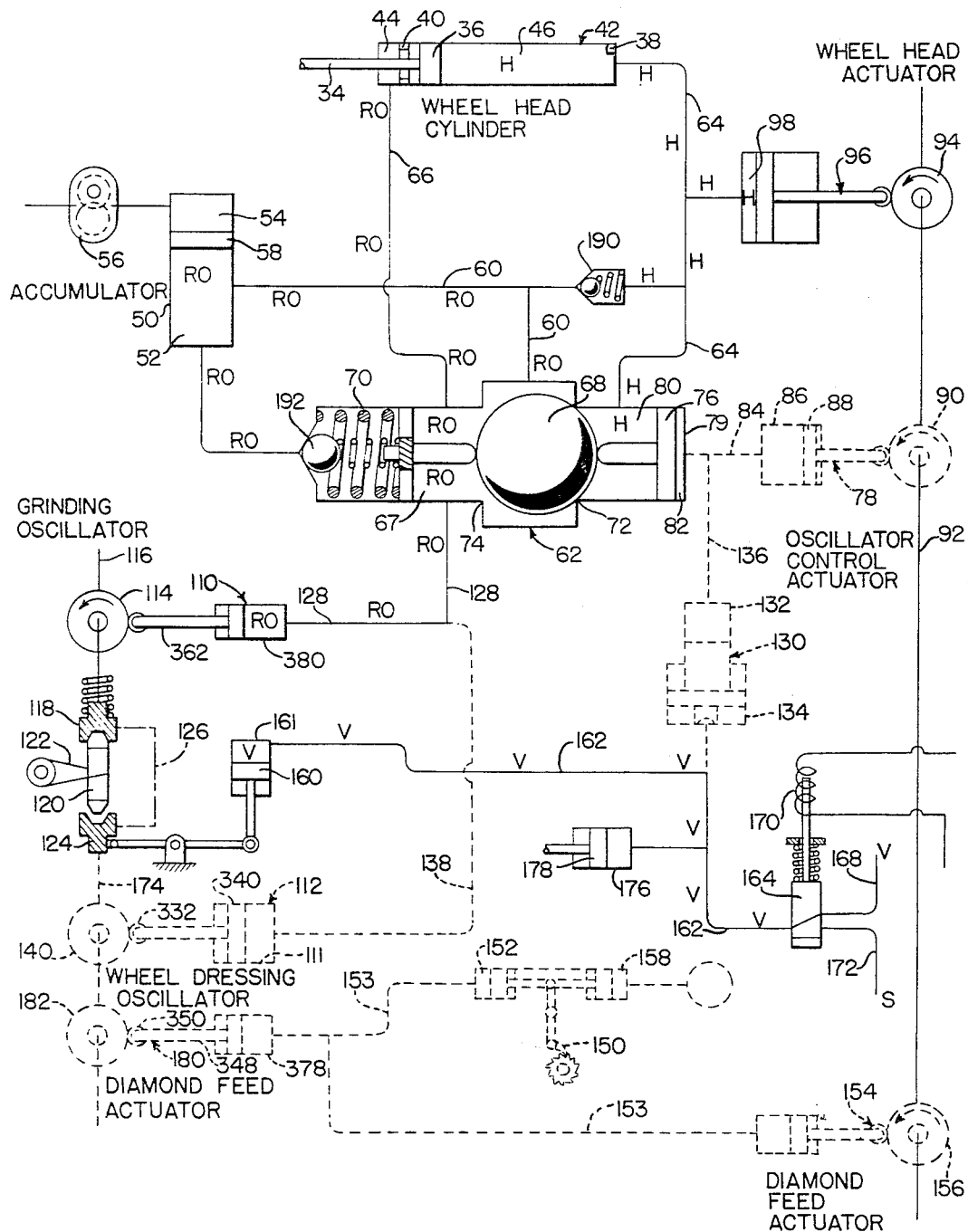
FIGS. 3 to 6 are diagrams of the oscillator mechanism and its controls in various conditions of operation, FIG. 3 representing the grinding wheel in its grinding position but not oscillating.

The accumulator 50 constantly supplies RO by a conduit 60 to a valve 62 which may direct RO either to the head end of the cylinder 42 by a conduit 64 or to the rod end by a conduit 66. The valve includes a ball 68 constantly urged by a return spring 70 toward a return seat 72. When the ball is on this seat RO exerts pressure (from conduit 60 through chamber 67 of the valve and conduit 66) in the rod end 44 of the cylinder to urge the piston 36 away from the work, that is to the right as seen in FIG. 3. The ball 68 may be held off the return seat 72 and (for oscillation) against a seat 74 by a pin on a piston 76 forming part of an oscillator control actuator generally designated 78. The piston slides in a cylinder 79 forming part of the valve 62, and divides this cylinder into an oscillator control chamber 82 and a passage chamber 80. The control chamber 82 forms part of the oscillator control actuator 78, which also includes the pipe 84 connecting chamber 82 to another actuator chamber 86 closed by a piston 88 which is moved cyclically by a cam 90 on a constantly rotating shaft 92. The oscillator control actuator or pulsator 78 is a confined liquid motion transfer device as is known, as more fully described in my U.S. Patent 3,071,929.

The shaft 92 also drives a cam 94 forming part of a wheel head actuator designated as a whole by 96 which includes an actuating chamber 98 connected to pipe 64, for moving and holding the piston 36. The piston 36 may be oscillated by either of two pulsators 110 and 112 built like actuators 78 and 96 but operating at higher frequency. They are constantly connected hydraulically to rod end 44, but are made operative selectively.

The normal grinding pulsator 110 includes a cylinder 380 and is driven by a cam 114 on a shaft 116 rotated at times by a normally engaged clutch 118 from a constantly rotating shaft 120 driven by a motor belt 122. The pulsator 112, which is for dressing a new wheel, includes a cylinder 111 driven from the same shaft 120 whenever the machine releases the clutch 118 engages another clutch 124 mechanically connected to clutch 118 by connection 126, as will be explained.

FIG. 3 shows the apparatus when the grinding wheel has just been advanced into grinding position within the work (which is out of contact with the wheel).

The closed circuit of the wheel head actuator 96 is formed by the head end chamber 46, pipe 64, chamber 98, and chamber 80 when closed by seated ball 68. The force of RO pressure on the left of the ball and the force of the spring 70 together hold the ball seated against pressure developed by the wheel head actuator 96 as the cam 94 rotates to the position in which it has pushed the piston 36 against RO pressure and holds the piston 36 in the position shown in FIG. 3.

The grinding oscillator cam 114 is rotating as indicated by the arrow which means that the piston in grinding pulsator 110 is being oscillated. However the wheel is not being oscillated because the pulsator 110, which is connected to the chamber 67 of the valve 62 by the pipe 128, cannot develop pulsating pressure in the rod end chamber 44, since the accumulator 50 is connected to the pipes 66 and 128 through the pipe 60 and the chamber 67. Consequently oscillation of the piston in grinding pulsator 110 merely pumps oil into and out of the accumulator against the constant pressure of the air in chamber 54. This prevents any change of pressure in the rod end chamber 44.

Figure 4:
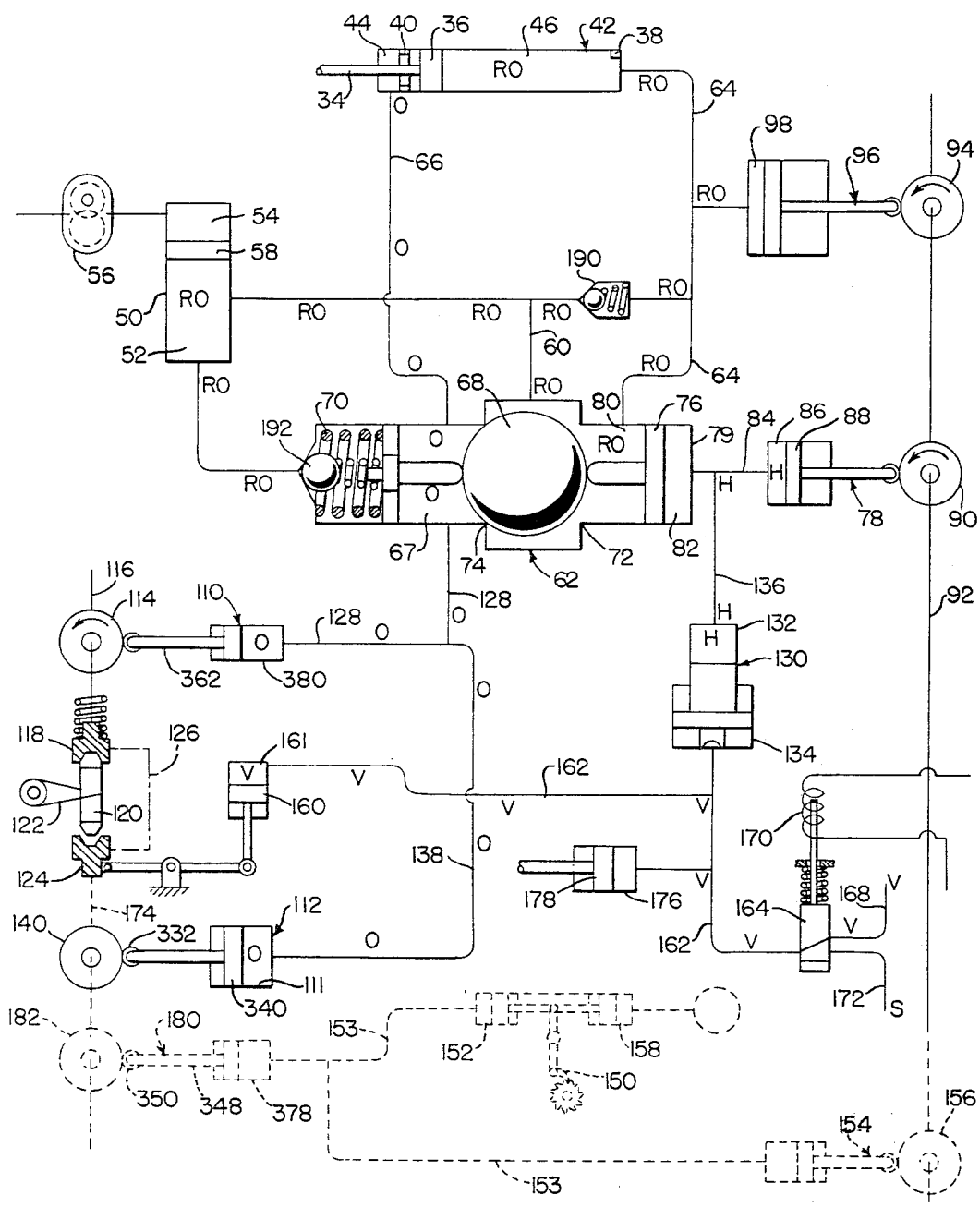

FIG. 4 shows the position of the apparatus a moment later than FIG. 3. The oscillator control actuator 78 has become active as indicated by solid lines, due to rotation of the cam 90 to the position which advances the piston 88. This forces oil into the chamber 82, forcing the piston oscillator control 76 to the left and moving the ball 68 against the force of the return spring 70 and holding it on the oscillating seat 74.

A force-multiplying free piston 130 having a portion of small diameter in a cylinder 132 and a portion of large diameter in a cylinder 134 is connected to the pipe 84 by a pipe 136. This piston is in its lowermost position against the bottom of the cylinder 134. It confines oil in the circuit of the oscillator control actuator 78 and serves as a reaction to permit the cam 90 to move and hold the piston 76 to the left.

The wheel head cam 94 continues to hold the piston of the wheel head oscillator 96 to the left and maintain the position of piston 36.

As soon as the ball is seated on the oscillating seat 74 the pipe 60 is cut off from communication with the chamber 67 and with the pulsator pipe 128 so that this latter pipe is now connected through chamber 67 and pipe 66 directly to the rod end chamber 44. Oscillation of the piston in grinding pulsator 110 now exerts pulsating pressure in the rod end, to oscillate the wheel. This varying pressure is maintained against the reaction point of the piston in new wheel dressing pulsator 112. This pulsator is connected into the oscillating circuit by pipe 138. Its stationary cam 140 now holds its piston.

Also the accumulator pipe 60 is connected through the chamber 80 to the pipe 64 and to the head end chamber 46 so that RO pressure is maintained in the head end. Since this pressure is supplied by the expansible accumulator the oil in the pipe 64 is not confined. Consequently whenever the pressure in the pipe 128 rises above RO pressure the piston 36 is moved to the right and whenever the oil pressure in pipe 128 falls below RO pressure the piston 36 is moved to the left.

The form of the grinding oscillator cam 114, the speed of the shaft 116 and the diameter of the piston in the grinding oscillator 110 are coordinated so that the wheel is oscillated through a short stroke, which might be for example a few thousandths of an inch, and at the desired frequency. During this phase of the operation the work is slowly advanced against the face of the wheel for a predetermined time until it has been rough ground to the desired size. This is done by any suitable apparatus, as disclosed for example in my Patent 3,218,760.

Figure 5:
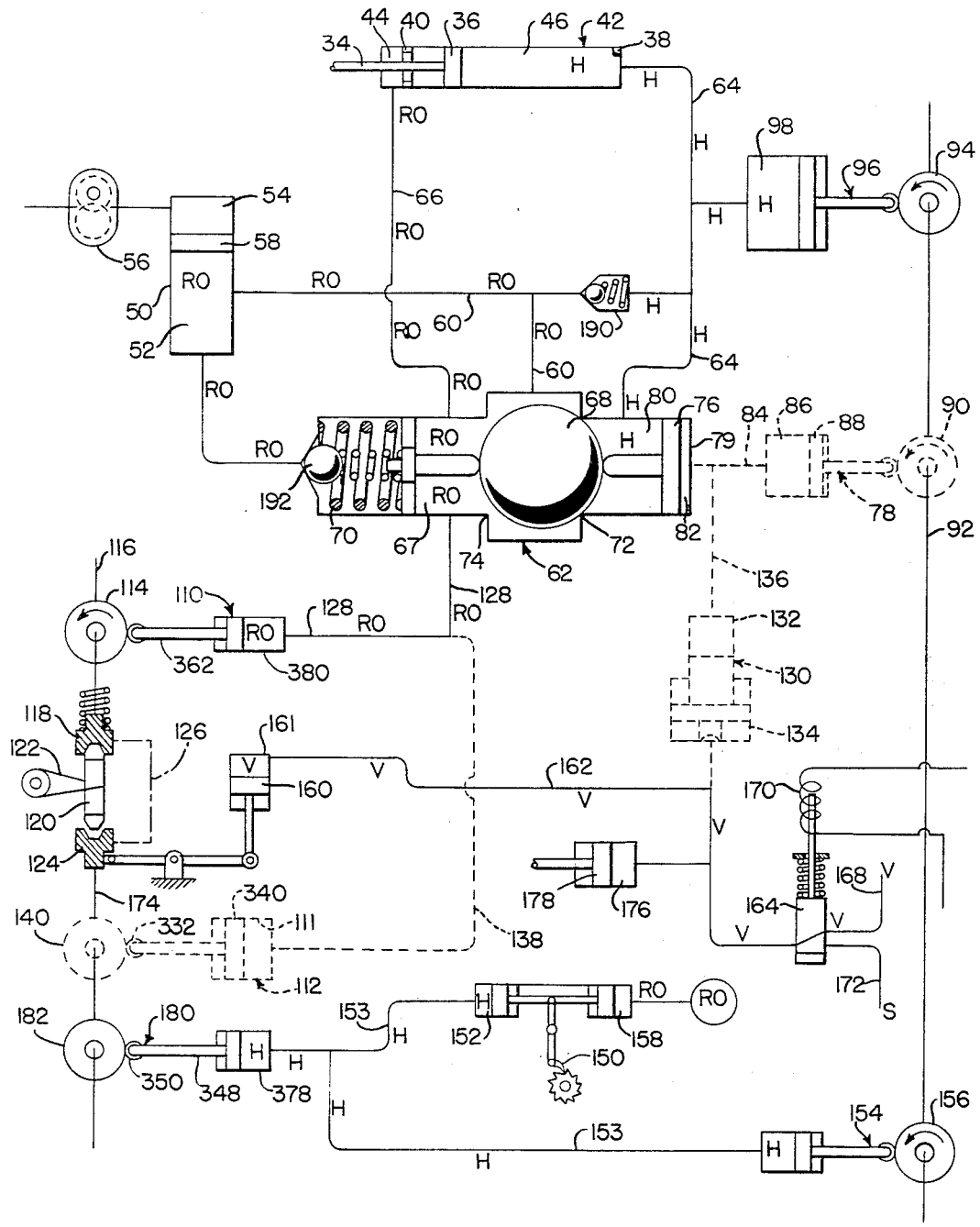

At the end of the predetermined grinding period the wheel head actuator withdraws the wheel from the work for a light dressing preparatory to final finish grinding. FIG. 5 shows this condition. The oscillator control cam 90 has receded to permit the ball 68 to seat on the return seat 72, making the oscillator control actuator 78 inactive, although its cam 90 continues to rotate. The seating of the ball closes the wheel head actuator circuit formed by the head end 46 and cylinder 98 of wheel head actuator 96. The cam 94 has receded to provide room in the head end 46 to permit RO, now in the rod end via pipes 60 and 66 and valve chamber 67 to move the piston 36 to the intermediate position shown in FIG. 5. This withdraws the wheel from the work and across a diamond dressing tool as disclosed in my U.S. Patent 3,218,760. The grinding pulsator 110 continues to oscillate but merely surges RO as shown by RO in its circuit in FIG. 5.

Each time the wheel is withdrawn to be dressed for finish grinding, the diamond dressing tool is fed toward the wheel. This may be just before the wheel is withdrawn, or just before it is advanced again, or both. The diamond is fed forward the required precise distance by a ratchet 150 moved forward by a piston in a cylinder 152 connected to a pipe 153 and forming part of a diamond feed impulse actuator 154 operated by a cam 156 on camshaft 92. This actuator is made like the other actuators herein and its cam is timed to operate the ratchet each time the wheel head actuator 96 withdraws the wheel for dressing. The ratchet and its operating piston in cylinder 152 are returned by RO in a return cylinder 158. Thereafter wheel head cam 94 returns its piston to the left, returning the piston 36 to the grinding position of FIG. 3, and after the wheel has been dressed, the oscillator control actuator 78 moves ball from return seat 72 to oscillating seat 74, and oscillating resumes as shown in FIG. 4 for the finish grinding.

After each work piece is finished, automatic controls for example as disclosed in Patent 3,218,760 may retract the wheel, remove the finished work piece, insert a new work piece in the work holder and return the wheel to grinding position, FIG. 3.

Eventually the wheel wears out. Then an automatic signal, not shown, indicates the condition, and neither the operator or an automatic control stops the machine with a cycle stop switch which assures that the machine stops with its cam shafts in predetermined positions. The operator then puts a new wheel on the turbine spindle. This new wheel must be dressed precisely to the required size, roundness and alignment. For dressing, the wheel is oscillated across the diamond dressing tool through a long stroke which includes the entire length of the wheel and the diamond is fed forward once for each stroke or each cycle, as may be preferred. This is done by the apparatus in the condition shown in FIG. 6.

Figure 6:
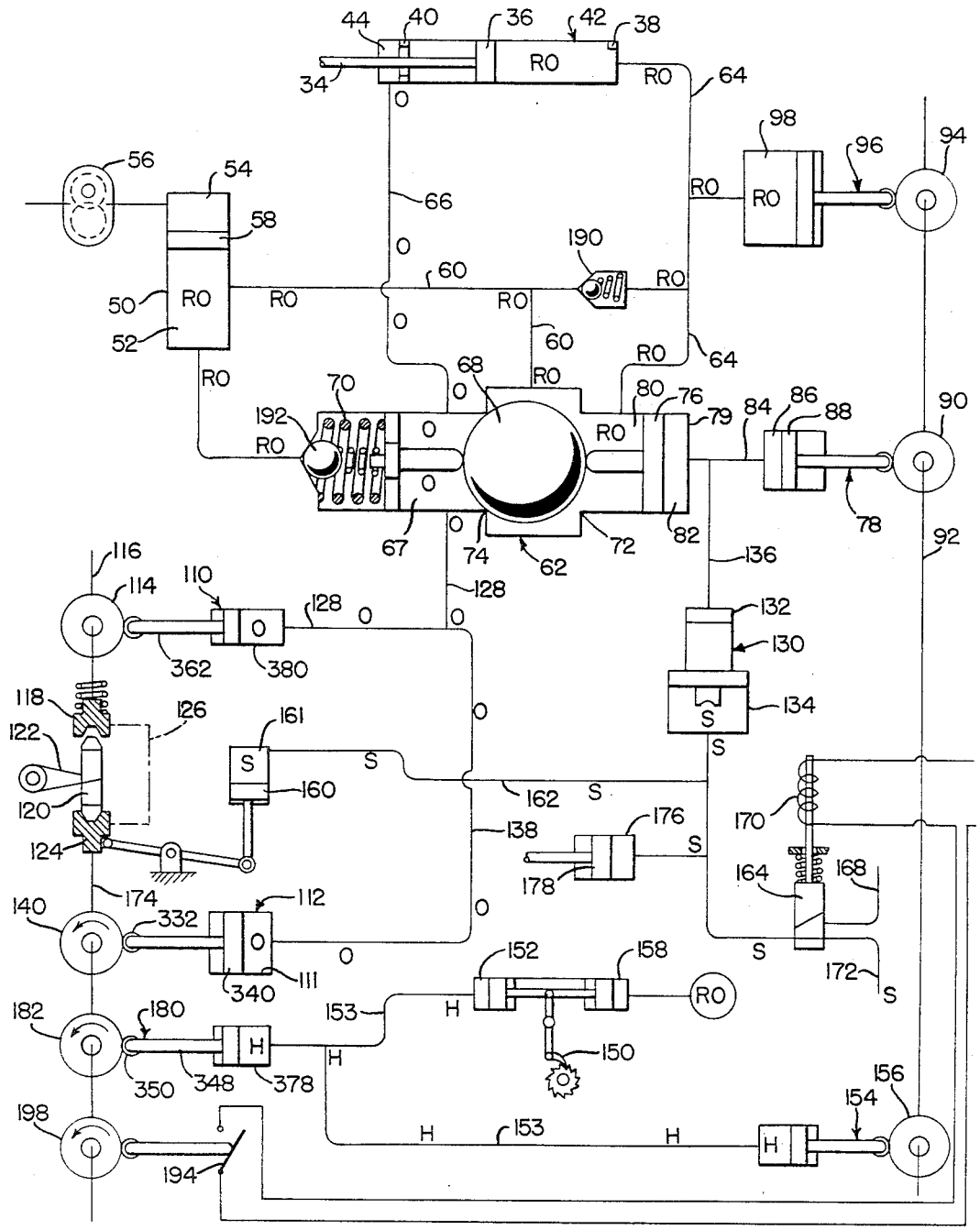

The machine has stopped with the piston 36 in an appropriate position to dress the wheel, indicated in FIG. 6. When the machine is started again, the cam shaft 92, which rotates constantly during the grinding operation, as described above, is now still. Also a clutch-shifting motor including a piston 160 in a cylinder 161 has heretofore been vented by the pipe 162, spring-closed valve 164 and vent port 168, as shown in FIG. 5. Now a solenoid 170 is energized to raise valve 164 from the position of FIG. 5 to the position of FIG. 6. This closes the vent 168 and opens the valve to connect line 162 to a source of pressure 172 to pressurize the motor 160 which then engages clutch 124 and disengages the clutch 118. This shifting of clutches permits shaft 116 to stop and rotates shaft 174 which rotates cam 140 to drive wheel dressing oscillator 112. Pressurizing the pipe 162 also lifts the free piston 130 to cause a pressure impulse in pipe 136. Due to the reaction of the stationary piston 88, this moves the ball 68 off the return seat 72 and holds it on the oscillating seat 74. RO enters the head end chamber 46, and wheel dressing oscillator 112, connected in a confined-volume circuit with the rod end chamber 44 through valve chamber 67 and pipes 66, 128 and 138, now oscillates the piston 36 through a long stroke, as determined by the displacement of the oscillating piston.

The diamond dressing tool, which is part of the grinder shown in FIG. 1, is mounted in a holder which is pivoted on a shaft and moved by a pressure cylinder into or out of the path of the wheel, as disclosed in my U.S. Patent 3,218,760. When a new wheel is to be dressed, the diamond must be pivoted into the path of the wheel. This is done by connecting said cylinder of said patent, herein represented as 176, to the line 162. Whenever the line 162 is pressurized, that is whenever the wheel dressing shaft is rotated, the diamond is placed in dressing position. Whenever the line 162 is vented, the diamond is moved out of the way.

After each pass of the wheel under the diamond tool in dressing the wheel the diamond is advanced to dress the wheel on the next stroke. This is done by a second diamond feed actuator 180 driven by a cam 182 on the cam shaft 174 and connected to pipe 153. This is timed so that after every stroke of the wheel dressing oscillator 112 the actuator 180 operates one stroke to advance the ratchet 150. At this moment the finish-dress-diamond-feed actuator 154 is held by its cam 156 and forms the reaction point for the impulse of actuator 180.

In confined liquid column actuators it is customary to have in the column, when the cam begins its advance, a greater volume of liquid than is required for the positive and precise displacement of the actuated part. This assures precise displacement in spite of any loss of liquid by leak. The cam continues to rise after the part has reached the limit of its movement, and this suddenly increases the pressure in the actuator circuit to blow off the excess volume of oil through a relief valve. In the case of wheel head actuator 96 the ball 68 seated on seat 72 by spring 70 acts as a relief valve when piston 36 reaches left hand stop 40. On the return stroke which withdraws the wheel to insert a new workpiece the cam 94 continues to fall or withdraw after the piston 36 reaches the limit of its stroke at right hand stop 38, and the pressure in pipe 64 falls below RO pressure in pipe 60. This opens a replenishing check valve 190 to fill the circuit again to its original excess volume.

Figure 10:
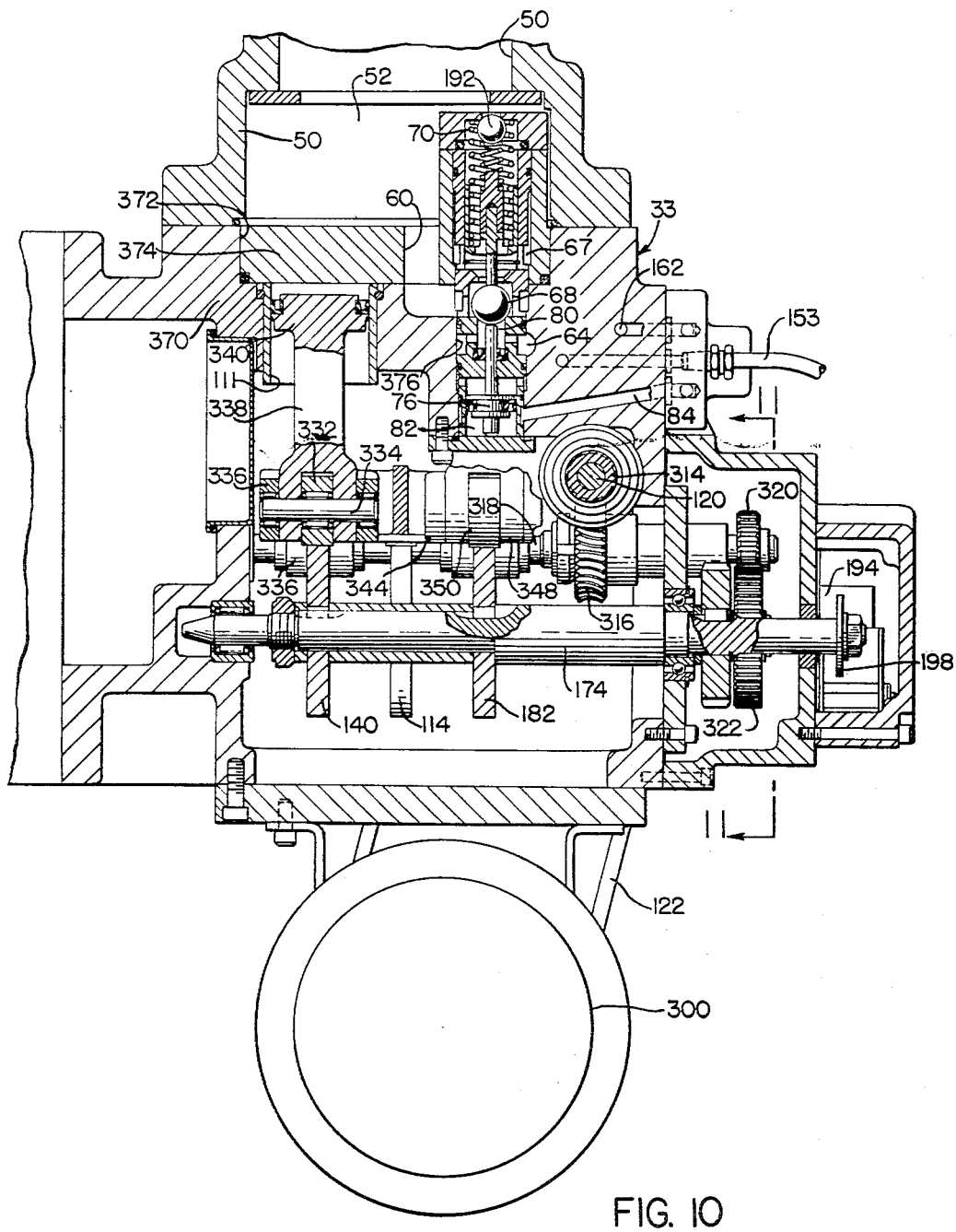
FIG. 10 is a section on the line 10—10 of FIG. 8.

Other actuator circuits may be connected to balance valves, not shown, but each including a relief valve and a replenishing check valve as disclosed for example in FIG. 10 of my Patent 3,071,929.

If the pressure in the circuit of oscillator 110 or 112 should fall below a predetermined value, such as 50 p.s.i., indicating leakage, RO can make up the loss through a replenishing check valve 192.

After the new wheel has been dressed, the wheel is advanced to grinding position and oscillated there, as shown consecutively in FIGS. 3 and 4 and described above. This requires shifting the clutches 118, 124 by deenergizing the solenoid 170 to let valve 164 drop to vent clutch motor line 162. This stops shaft 174, and it is important to have this shaft stop in a predetermined position, for example after the completion of a new wheel dressing stroke and before the diamond is advanced again. To accomplish this a normally closed stop switch 194 is included in the control circuit of solenoid 170, which switch must be opened to de-energize the solenoid. This switch is opened by a cam 198 on the wheel dressing shaft only when this shaft is in the desired position.

FIGS. 7 to 11 show one form of actual structure of some of the principal elements of the oscillator 33. As shown in FIG. 1 the casing containing the oscillator is mounted on the frame 30 of the grinder, generally in line with the sliding carriage support 32. A motor 300 (FIGS. 1, 7) attached to the bottom of the casing supplies the motive power for the oscillator, except for the cam shaft 92 which is part of a cam shaft in the grinder shown in FIG. 1. The motor 300 drives the oscillator through the belt 122 which rotates an input pulley 302 mounted on the constantly rotating input clutch shaft 120 (FIGS. 3, 9) which lies in a plane perpendicular to the direction of travel of the carriage 26. This shaft carries one member of each of the clutches and two worm wheels which drive the grinding and wheel dressing oscillator shafts.

Figure 9:
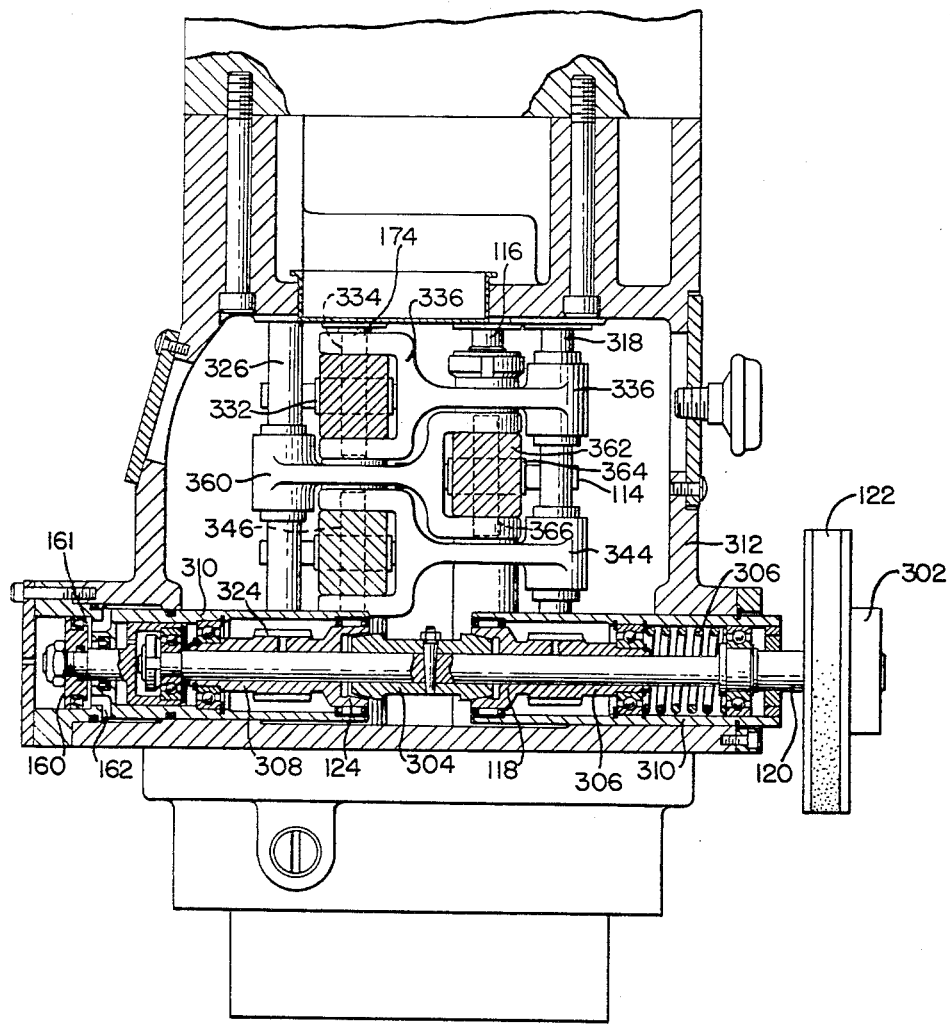
FIG. 9 is a section on the line 9—9 of FIG. 7.
Figure 11:
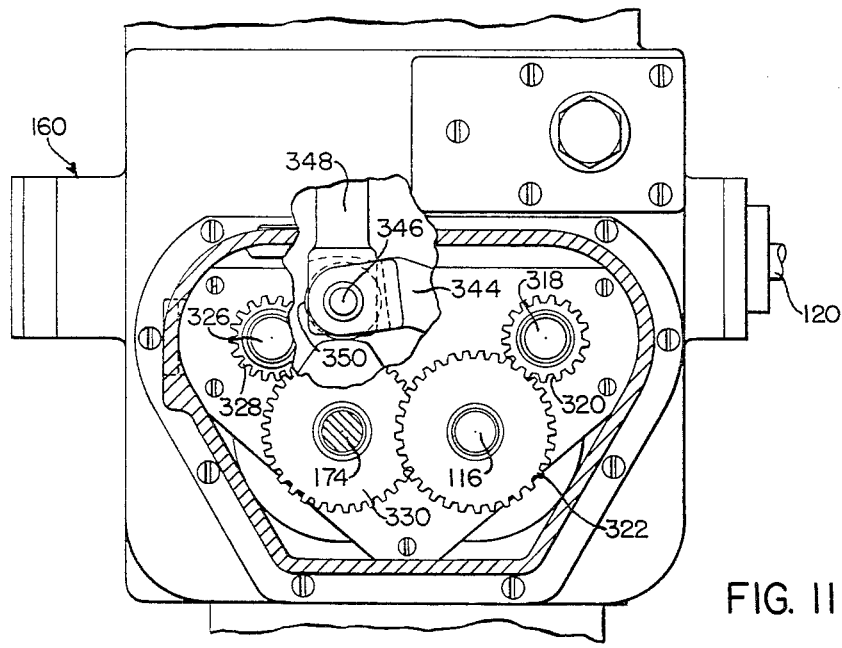
FIG. 11 is a section on the line 11—11 of FIG. 10, partly broken away.

Referring to FIG. 9, the shaft 120 has pinned to it a central double male cone clutch member 304 which, when held to the right by spring 306 as FIG. 9 is seen, engages the female cone clutch member 118 to drive the grinding oscillator shaft, and when held to the left, against the force of the spring by pressure in chamber 161, engages the female cone clutch member 124 to drive the wheel dressing oscillator shaft. Each female cone is part of a sleeve journaled in radial and thrust bearings in a sleeve 310 fixed in the casing 312 of the oscillator. The grinding oscillator clutch sleeve 118 is formed with a worm 314 which engages a worm wheel 316 (FIG. 10) keyed to an intermediate shaft 318, to the right end of which is keyed an intermediate gear 320 (FIGS. 10, 11) driving an oscillator cam shaft gear 322 keyed to the grinding oscillator cam shaft 116 (FIGS. 3, 11). The oscillator cam 114 is keyed to this shaft 116, FIGS. 9, 10.

Wheel dressing clutch sleeve 124 is formed with a worm 324 which engages a worm wheel (cut off from view by the location of section line 10—10). This worm wheel is like worm wheel 316 (FIG. 10) and is keyed to a second intermediate shaft 326 (FIGS. 9, 11) keyed to a second intermediate gear 328 (FIG. 11) meshing with a driving gear 330. This latter is keyed to the wheel dressing cam shaft 174 having the wheel dressing oscillator cam 140 and the diamond feed cam 182 keyed thereto. As shown in FIGS. 3, 9, 11, a roller cam follower 332 for wheel dressing cam 140 is journaled on a pin 334 journaled in bearings in the split end of a fork 336, the other end of which fork is journaled on intermediate shaft 318. Also journaled on the pin 334 and between the legs of the fork 336 is a forked piston rod 338 straddling the cam follower. The piston rod is fixed to a piston 340 sliding in the cylinder 111 of the wheel dressing oscillator 112. The piston may be made and related to the cylinder as disclosed in FIG. 22 of my Patent 3,071,929. The intermediate shaft 318 has journaled on it a similar fork 344 the split end of which carries a pin 346 on which are mounted a piston rod 348 and a roller follower 350 which latter rides on the diamond feed cam 182 (FIGS. 3, 10). Piston rod 348 is fixed to a piston made like piston 344 and sliding in the cylinder of diamond feed actuator 180 (FIG. 3).

The other intermediate shaft 326 (FIG. 9) carries fork 360 like the other forks having at its split end a piston rod 362 straddling a roller cam follower 364 journaled on a pin 366 and riding on the grinding oscillator cam 114. Piston rod 362 is fixed to a piston like the other pistons described which forms part of the grinding oscillator 112.

As shown in FIG. 10 the casing of the oscillator 33 has a thick portion 370 in the upper face of which is a large bore 372 to receive a plug or plate 374 forming the bottom of the accumulator and bolted to the part 370. In the bottom of the large bore and below the plate are various small bores which receive the valve 62 and various liners which form the cylinders of the actuators 110, 112 and 180. The valve 62 is placed in a bore 376. The outlines of the cylinder liners in the remaining bores are shown in broken lines in FIG. 8. Cylinder 111 is part of wheel dressing oscillator 180. Cylinder 378 is the diamond feed cylinder of actuator 180; 380 is the cylinder of oscillator 110. The plate 374 closes the ends of these cylinders and is sealed to form pumping chambers for the actuators. The various control and actuator passages previously identified are also formed in the plate 374 and thick part 370 of the casing by suitable coring and/or drilling and blocking as known in the art and as indicated by previously mentioned reference characters in FIGS. 7, 8, 10.

Figure 12:
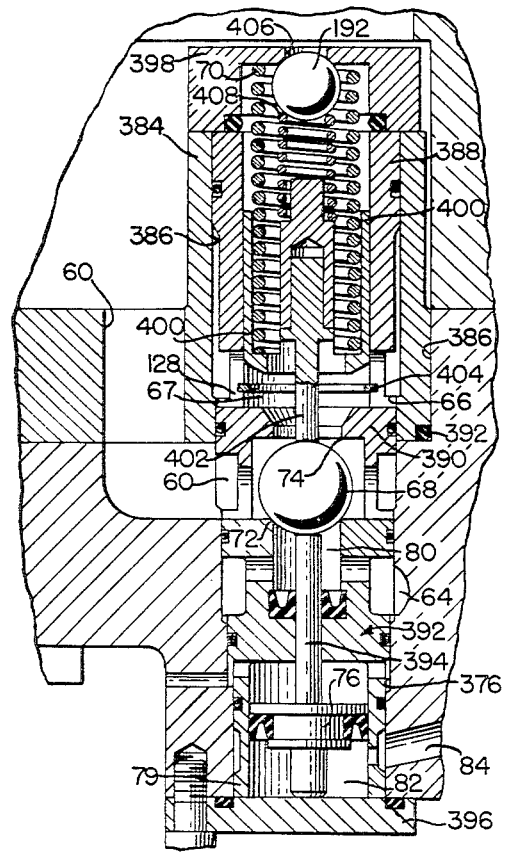
FIG. 12 is an enlarged portion of FIG. 10 showing a section of a valve.

FIG. 12 shows one form of construction and arrangement of the valve 62. A rectangular boss 384 is formed integral with plate 374 and has a through bore 386 matching the valve bore 376. The valve is placed in these two bores. The valve includes a first liner 388 having the chamber 67 inside it, and is grooved and pierced to provide parts of the oscillator passages 66 and 128. A second aligned liner 390 includes the oscillating seat 74 and is grooved and pierced to provide part of the RO passage 60. These two liners are in alignment with a third liner 392 which includes the return seat 72, a space forming the chamber 80, and the cylinder 79 holding the piston 76. The liner 392 is grooved and pierced to form part of the passage 64 connected with the chamber 80. The piston has a pin 394 for moving the ball off of seat 72 and holding it on seat 74. The cylinder 82 is closed by a bottom plate 396 bolted to the thick part 370 of the casing. This plate holds the valve assembled from the bottom. The valve is sealed and held assembled from the top by a top plate 398 bolted to the boss 384 and confining the compression spring 70 against a spring cup 400 which carries a pin 402 for urging the ball toward return seat 72. The spring cup is confined by a stop ring 404. The top plate is pierced by a passage 406 which admits RO from the accumulator to the chamber 67 under control of the ball check valve 192 normally seated by spring 408.

Figure 7:
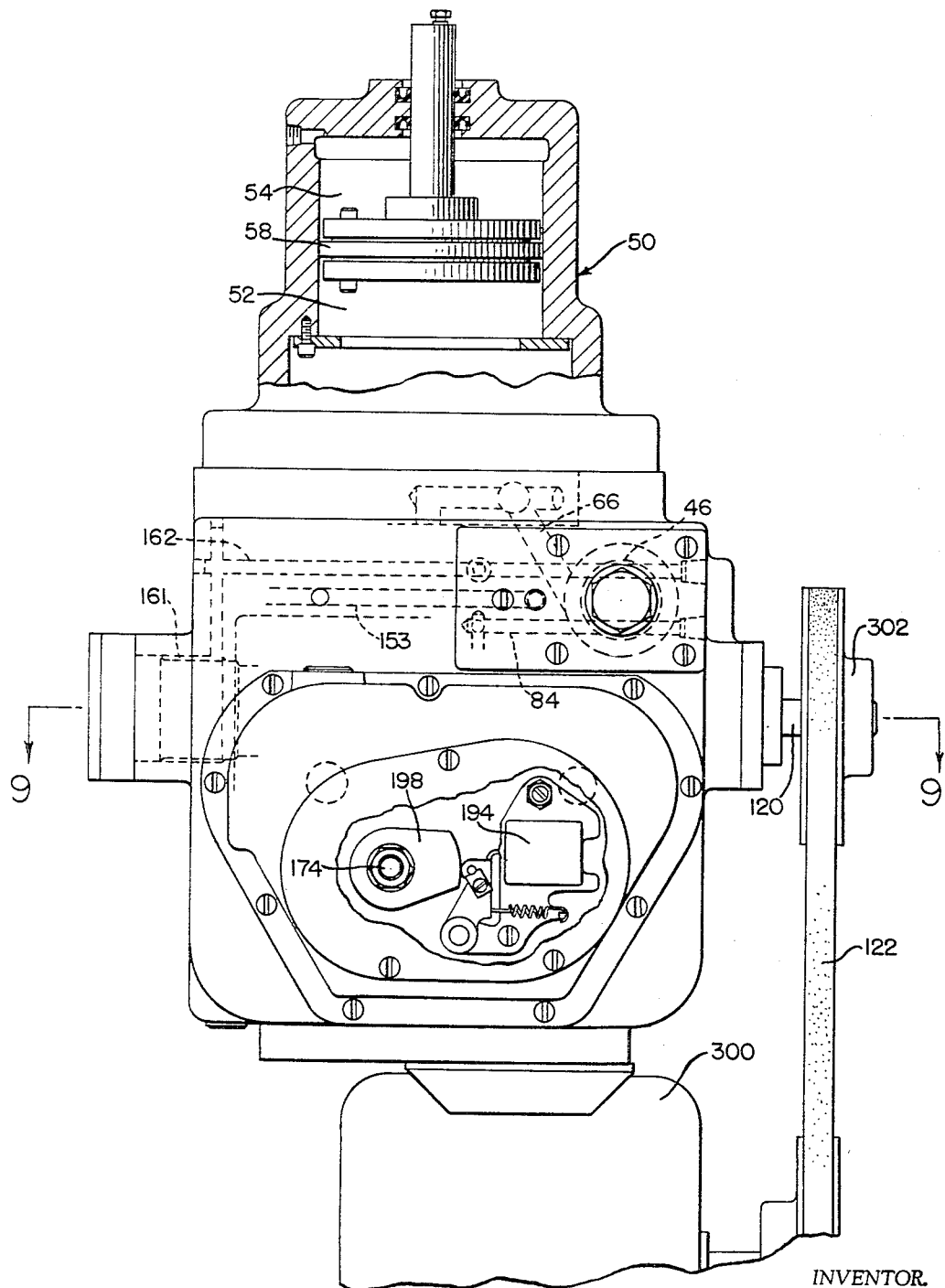
FIG. 7 is a section on the line 7—7 of FIG. 2, partly broken away.
Figure 8:
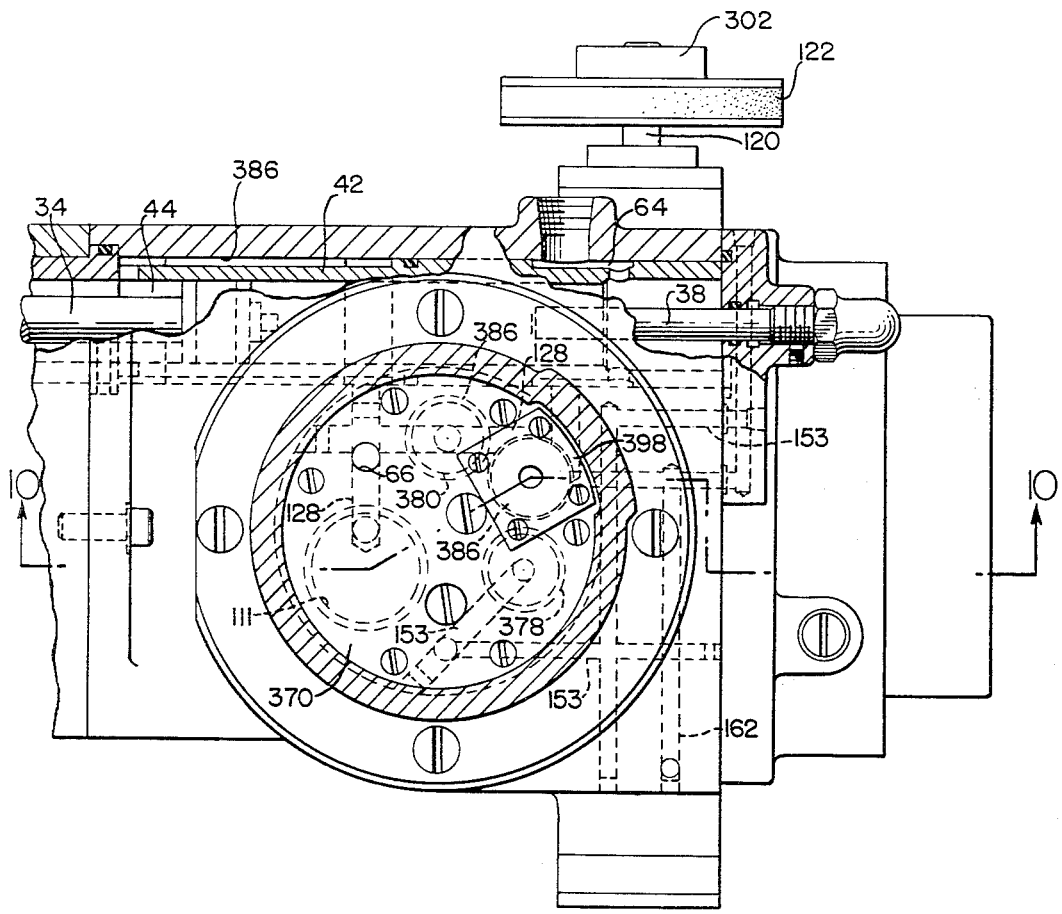
FIG. 8 is a section on the line 8—8 of FIG. 2, partly broken away.

FIGS. 7, 10 show the construction and arrangement of the cam 198 carried by wheel dressing cam shaft 174 for operating switch 194 to assure de-energizing of solenoid 170 at the proper time to stop the shaft 174 in proper position.

The oscillator is contained in a unitary casing which can be readily bolted to an existing grinder as shown in FIGS. 1 and 2 with its oscillating cylinder 42 aligned with the direction of travel of the wheel carriage. The cam shafts 116 and 124 and lay shafts 318 and 326 that drive them are parallel to this cylinder and below it in the casing. The rocker arms 336 and 344 are pivoted on one lay shaft 318 so that their cam followers ride on the cams on the opposite cam shaft 326 not driven by the shaft 318.

Similarly the rocker arm 360 is journaled on the other lay shaft 326 and its cam follower rides on cam 114 on the opposite shaft not driven by lay shaft 326. This has advantages of economy, compactness and efficiency not found in prior known oscillators.

This compactness and efficiency are further enhanced by the arrangement in the same casing of the extremely simple valve 62 and the various pistons and control passages. The accumulator 50 is formed by a dome bolted to the casing over the valve 62 so that one end of the valve is placed in the oil in the accumulator. This simplifies passages and connections.

The valve itself is simple and efficient. Any leakage of control oil from the high pressure side (either pipe 64 or chamber 67) past the valve seats must flow into the lower pressure accumulator circuit and such leakage is made up automatically from the accumulator by replenishing valves. The valve is controlled by moving parts entirely sealed within the valve casing so that no leakage outside the casing due to movement of control parts can occur.

1. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator having its liquid circuit connected to one chamber, a second liquid column actuator having its liquid circuit connected to the other chamber, each of said actuators cyclically developing a pressure greater than the pressure of said source, and a valve for controlling the end wall means, said valve including means defining three spaces, the first space being constantly connected to one of said chambers, the second space being constantly connected to the other of said chambers and the third space being constantly connected to said source, and means movable to a first position for establishing communication betwen the first and third spaces while preventing communication between the second and third spaces, and movable to a second position for establishing communication between the second and third spaces while preventing communication between the first and third spaces.

2. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator including a continuously operatable hydraulic impulse generator and having its liquid circuit permanently connected to one chamber, a second liquid column actuator including a hydraulic impulse generator and having its liquid circuit permanently connected to the other chamber, a continuously rotatable operator for the second impulse generator, each of said actuators cyclically developing a pressure greater than the pressure of said source, a valve movable to two positions, in one of which it connects said source to the first actuator circuit and confines the liquid in the second actuator circuit, and in the other of which positions it confines the liquid in the first actuator circuit and connects said source to the second actuator circuit, and means responsive to the angular position of the operator for moving the valve from one position to the other.

3. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator having its liquid circuit connected to one chamber, a second liquid column actuator having its liquid circuit connected to the other chamber, each of said actuators cyclically developing a pressure greater than the pressure of said source, and a valve movable to two positions, in one of which it connects said source to the first actuator circuit and confines the liquid in the second actuator circuit, and in the other of which positions it confines the liquid in the first actuator circuit and connects said source to the second actuator circuit.

4. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator including a continuously operatable hydraulic impulse generator and having its liquid circuit permanently connected to one chamber, a second liquid column actuator including a continuously operatable hydraulic impulse generator and having its liquid circuit permanently connected to the other chamber, each of said actuators cyclically developing a pressure greater than the pressure of said source, and a valve movable to two positions, in one of which it connects said source to the first actuator circuit and confines the liquid in the second actuator circuit, and in the other of which positions it confines the liquid in the first actuator circuit and connects said source to the second actuator circuit.

5. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator having its liquid circuit connected to one chamber, a second liquid column actuator having its liquid circuit connected to the other chamber, each of said actuators cyclically developing a pressure greater than the pressure of said source, and means for selectively connecting said source to the first actuator circuit and confining the liquid in the second actuator circuit for positioning the piston and for confining the liquid in the first actuator circuit and connecting said source to the second actuator circuit for oscillating the end wall means.

6. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator having its liquid circuit connected to one chamber, a second liquid column actuator including an impulse generator and having its liquid circuit connected to the other chamber, a continuously rotatable operator for the impulse generator, each of said actuators cyclically developing a pressure greater than the pressure of said source, a valve movable to two positions, in one of which it connects said source to the first actuator circuit and confines the liquid in the second actuator circuit, and in the other of which positions it confines the liquid in the first actuator circuit and connects said source to the second actuator circuit and means responsive to the angular position of the operator for moving the valve from one position to the other.

7. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column actuator having its liquid circuit connected to one chamber, a second liquid column actuator including an implse generator and having its liquid circuit connected to the other chamber, a continuously rotatable operator for the impulse generator, each of said actuators cyclically developing a pressure greater than the pressure of said source, a valve movable to two positions, in the first of which it connects said source to the first actuator circuit and confines the liquid in the second actuator circuit, and in the second of which positions it confines the liquid in the first actuator circuit and connects said source to the second actuator circuit, means constantly urging the valve member toward the first position, and means responsive to the angular position of the operator for overcoming the urging means and holding the valve member in the second position.

8. An oscillator for cyclically moving a part back and forth comprising in combination a pressure cylinder having movable end wall means defining an advancing chamber a second pressure cylinder having movable end wall means defining a retracting chamber, a source of liquid pressure, an oscillator having its liquid circuit connected to one chamber, a liquid column actuator including an impulse generator and having its liquid circuit connected to the other chamber, a continuously rotatable operator for the impulse generator, said oscillator and actuator each cyclically developing a pressure greater than the pressure of said source, a casing containing a valve movable to two positions, in one of which it connects said source to the oscillator circuit and confines the liquid in the actuator circuit for positioning the piston, and in the other of which positions it confines the liquid in the oscillator circuit and connects said source to the actuator circuit for oscillating the end wall means, a piston movable in a pressure cylinder within the casing for moving the valve from one position to the other, means constantly urging the valve member toward the first position, means for overcoming the urging means and holding the valve member in the second position, a second impulse generator driven by the operator in timed relation to the first impulse generator, and means connecting the second impulse generator to the valve cylinder for moving the valve against the urging means in response to the angular position of the operator.

9. An oscillator for cyclically moving a part back and forth comprising in combination a pressure cylinder having movable end wall means defining an advancing chamber, a second pressure cylinder having movable end wall means defining a retracting chamber, a source of liquid pressure, a first liquid column oscillator having its liquid circuit connected to one chamber, a liquid column actuator including an impulse generator and having its liquid circuit connected to the other chamber, a continuously rotatable operator for the impulse generator, said oscillator and actuator each cyclically developing a pressure greater than the pressure of said source, a valve movable to two positions, in the first of which it connects said source to the oscillator circuit and confines the liquid in the actuator circuit for positioning the end wall means, and in the second of which positions it confines the liquid in the oscillator circuit and connects said source to the actuator circuit for oscillating the end wall means, means responsive to one angular position of the operator for moving the valve from the first position to the second, and responsive to another angular position for moving the valve from the second position to the first, a second oscillator whose liquid circuit is connected to the liquid circuit of the first oscillator, an input shaft, means for selectively connecting the input shaft to either oscillator, and means responsive to connection of the shaft to the second oscillator after movement of the valve to the first position for moving the valve to the second position.

10. An oscillator for moving a part back and forth comprising in combination a sealed casing having opposing end chambers each surrounding a valve seat and a center chamber containing a ball adapted to rest on either seat for establishing communication between the center chamber and one end chamber and preventing communication between the center chamber and the other end chamber, means in one end chamber constantly urging the ball toward the seat of the other end chamber, pressure responsive means in the other end chamber for holding the ball against the seat of said one end chamber, and means for selectively pressurizing and de-pressurizing said pressure responsive means.

11. An oscillator for cyclically moving a part back and forth comprising in combination an advancing pressure chamber, a retracting pressure chamber, a source of liquid pressure, a first liquid column actuator having its liquid circuit connected to one chamber, a second liquid column actuator having its liquid circuit connected to the other chamber, each of said actuators cyclically developing a pressure greater than the pressure of said source and one of the actuators having a displacement greater than the maximum volume of the chamber to which it is connected, means for selectively connecting said source to the first actuator circuit and confining the liquid in the second actuator circuit for positioning the part and for confining the liquid in the first actuator circuit and connecting said source to the second actuator circuit for oscillating the part, a pressure relief valve for discharging liquid from one liquid column to the source, and a second pressure relief valve for discharging liquid from the source to said one liquid column.

12. An oscillator for cyclically moving a part back and forth comprising in combination an advancing pressure chamber, a retracting pressure chamber, a source of liquid pressure, a first liquid column actuator having its liquid circuit connected to one chamber, a second liquid column actuator having its liquid circuit connected to the other chamber, each of said actuators cyclically developing a pressure greater than the pressure of said source and one of the actuators having a displacement greater than the maximum volume of the chamber to which it is connected, means for selectively connecting said source to the first actuator circuit and confining the liquid in the second actuator circuit for positioning the part and for confining the liquid in the first actuator circuit and connecting said source to the second actuator circuit for oscillating the part, a pressure relief valve for discharging liquid from one liquid column to the source, and a second pressure relief valve for discharging liquid from the source to said one liquid column including means for limiting the pressure in one liquid column to a predetermined value below the pressure of the source when the source is connected to said one column.

13. An oscillator for moving a part back and forth comprising in combination an oscillatable member, a pressure chamber for urging the member in one direction, return means urging the member in the opposite direction, a first confined liquid column oscillator including a piston of relatively small displacement connected hydraulically to the chamber for oscillating the member through a relatively short stroke, a second confined liquid column oscillator including a piston of relatively large displacement connected hydraulically to the chamber for oscillating the member through a relatively long stroke, the first oscillator developing a pressure whose force in the chamber is alternately above and below the force of the return means when the second piston is in a predetermined range of positions, the second oscillator developing a pressure whose force in the chamber is alternately above and below the force of the return means regardless of the position of the first piston, first actuating means for reciprocating the piston of small displacement, second actuating means for reciprocating the piston of large displacement, means for driving either actuating means while stopping the other actuating means, and means for stopping the second actuating means only when the piston of large displacement is in a predetermined range of positions.

14. An oscillator for moving a part back and forth comprising in combination an oscillatable member, a pressure chamber for urging the member in one direction, return means urging the member in the opposite direction, a pair of confined liquid column oscillators connected in parallel to the chamber each adapted to develop a pressure whose force in the chamber is alternately above and below the force of the return means, an individual rotary actuator for each oscillator, rotary driving means for driving either actuator, a solenoid for shifting a driving connection from one actuator to the other, means for initiating change of current through the solenoid, a switch for completing the change of current initiated by said initating means, and a cam on one rotary actuator for operating the switch when and only when said one rotary actuator is in a predetermined range of angular positions.

15. An oscillator for moving a part back and forth comprising in combination an oscillatable member, a pressure chamber for urging the member in one direction, return means urging the member in the opposite direction, a pair of confined liquid column oscillators connected in parallel to the chamber each adapted to develop a pressure whose force in the chamber is alternately above and below the force of the return means, an individual rotary actuator for each oscillator, rotary driving means for driving either actuator, means for shifting a driving connection from one actuator to the other, and means responsive to initiation of the shift from one of the actuators for delaying the completion of the shift until said one actuator is in a predetermined range of angular positions.

16. An oscillator for cyclically moving a part back and forth comprising in combination an advancing pressure chamber, a retracting pressure chamber, a source relatively high liquid pressure, a first liquid column actuator having its liquid circuit connected to one chamber, a second liquid column actuator having its liquid circuit connected to the other chamber, each of said actuators cyclically developing a pressure greater than the pressure of said source, means for selectively connecting said source to the first actuator circuit and confining the liquid in the second actuator circuit for positioning the part and for confining the liquid in the first actuator circuit and connecting said source to the second actuator circuit for oscillating the part, a source of relatively low pressure, balance valve means connecting relatively high pressure source to one liquid column and balance valve means connecting the low pressure source to the other liquid column.

17. An oscillator for cyclically moving a part back and forth comprising in combination an advancing pressure chamber, a retracting pressure chamber, a source of liquid pressure connected to the retracting chamber, a liquid column actuator having its liquid circuit connected to the advancing chamber, a pressure relief valve for discharging liquid from the liquid column to the source and a second pressure relief valve for discharging liquid from the source to the liquid column.

References Cited
UNITED STATES PATENTS 1,944,351   1/1934   Landry _____ 60—54.5

MARTIN P. SCHWADRON, *Primary Examiner.*

R. R. BUNEVICH, *Assistant Examiner.*